United States Patent
Kato et al.

(10) Patent No.: US 12,344,394 B2
(45) Date of Patent: Jul. 1, 2025

(54) LIGHTNING STRIKE RESISTANT STRUCTURE OF FLYING OBJECT

(71) Applicant: Nippon Telegraph and Telephone Corporation, Tokyo (JP)

(72) Inventors: Jun Kato, Musashino (JP); Toshihisa Masuda, Musashino (JP); Masato Maruyama, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/035,833

(22) PCT Filed: Nov. 13, 2020

(86) PCT No.: PCT/JP2020/042476
§ 371 (c)(1),
(2) Date: May 8, 2023

(87) PCT Pub. No.: WO2022/102091
PCT Pub. Date: May 19, 2022

(65) Prior Publication Data
US 2023/0415916 A1    Dec. 28, 2023

(51) Int. Cl.
*B64D 45/02*    (2006.01)
*B64U 20/00*    (2023.01)
*B64U 10/14*    (2023.01)

(52) U.S. Cl.
CPC ........... *B64D 45/02* (2013.01); *B64U 20/00* (2023.01); *B64U 10/14* (2023.01)

(58) Field of Classification Search
CPC .................................................... B64D 45/02
See application file for complete search history.

(56) References Cited

U.S. PATENT DOCUMENTS

| | | | | |
|---|---|---|---|---|
| 4,818,990 | A * | 4/1989 | Fernandes | G05D 1/0038 340/310.17 |
| 4,842,221 | A * | 6/1989 | Beach | B64B 1/50 244/33 |
| 10,059,437 | B2 * | 8/2018 | Cooper | B64U 20/75 |
| 10,370,119 | B2 * | 8/2019 | Neely | H04N 13/204 |
| 10,619,988 | B2 * | 4/2020 | Klein | B64U 10/14 |

(Continued)

FOREIGN PATENT DOCUMENTS

| | | | | |
|---|---|---|---|---|
| CA | 3238891 | A1 * | 6/2023 | B64U 10/14 |
| CN | 107539466 | | 1/2018 | |

(Continued)

OTHER PUBLICATIONS

[No Author Listed] [online] "Drone vs lightning," The University of Manchester, Apr. 10, 2017, retrieved from URL <https://www.mub.eps.manchester.ac.uk/science-engineering/2017/04/10/drone-vs-lightning/>, 8 pages.

*Primary Examiner* — Magdalena Topolski
(74) *Attorney, Agent, or Firm* — Fish & Richardson P.C.

(57) ABSTRACT

A lightning strike resistant structure of a flying object includes a lattice-shaped conductor 11 surrounding a flying object 100 with a distance not hindering flight, an attachment part 12 for the conductor 11 connected between the lattice-shaped conductor 11 and a part of the flying object 100, and a conducting wire 13 connected between the lattice-shaped conductor 11 and a ground point on the ground.

3 Claims, 1 Drawing Sheet

(56) References Cited

U.S. PATENT DOCUMENTS

| | | | |
|---|---|---|---|
| 11,054,224 B1* | 7/2021 | Stephens | ................. F41H 11/02 |
| 2014/0001308 A1 | 1/2014 | Pardel et al. | |
| 2018/0002035 A1 | 1/2018 | Neely | |
| 2023/0399126 A1* | 12/2023 | Nourry | .................. B64D 45/02 |
| 2024/0182168 A1* | 6/2024 | Maruyama | ............. B64D 45/02 |
| 2024/0409236 A1* | 12/2024 | Arai | ........................ B64C 39/02 |
| 2025/0074616 A1* | 3/2025 | Maruyama | .............. B64C 39/02 |

FOREIGN PATENT DOCUMENTS

| | | | | |
|---|---|---|---|---|
| CN | 114560094 A | * | 5/2022 | |
| DE | 102017209279 A1 | * | 12/2018 | |
| DE | 102022002219 A1 | * | 2/2023 | |
| JP | 2004-225660 | | 8/2004 | |
| KR | 10-2017-0033625 | | 3/2017 | |
| RU | 2722087 C1 | * | 5/2020 | |
| WO | WO 2015/049798 | | 4/2015 | |
| WO | WO-2019113424 A1 | * | 6/2019 | ........... B64C 39/024 |
| WO | WO-2025052549 A1 | * | 3/2025 | |
| WO | WO 2025062580 A1 | * | 3/2025 | |

* cited by examiner

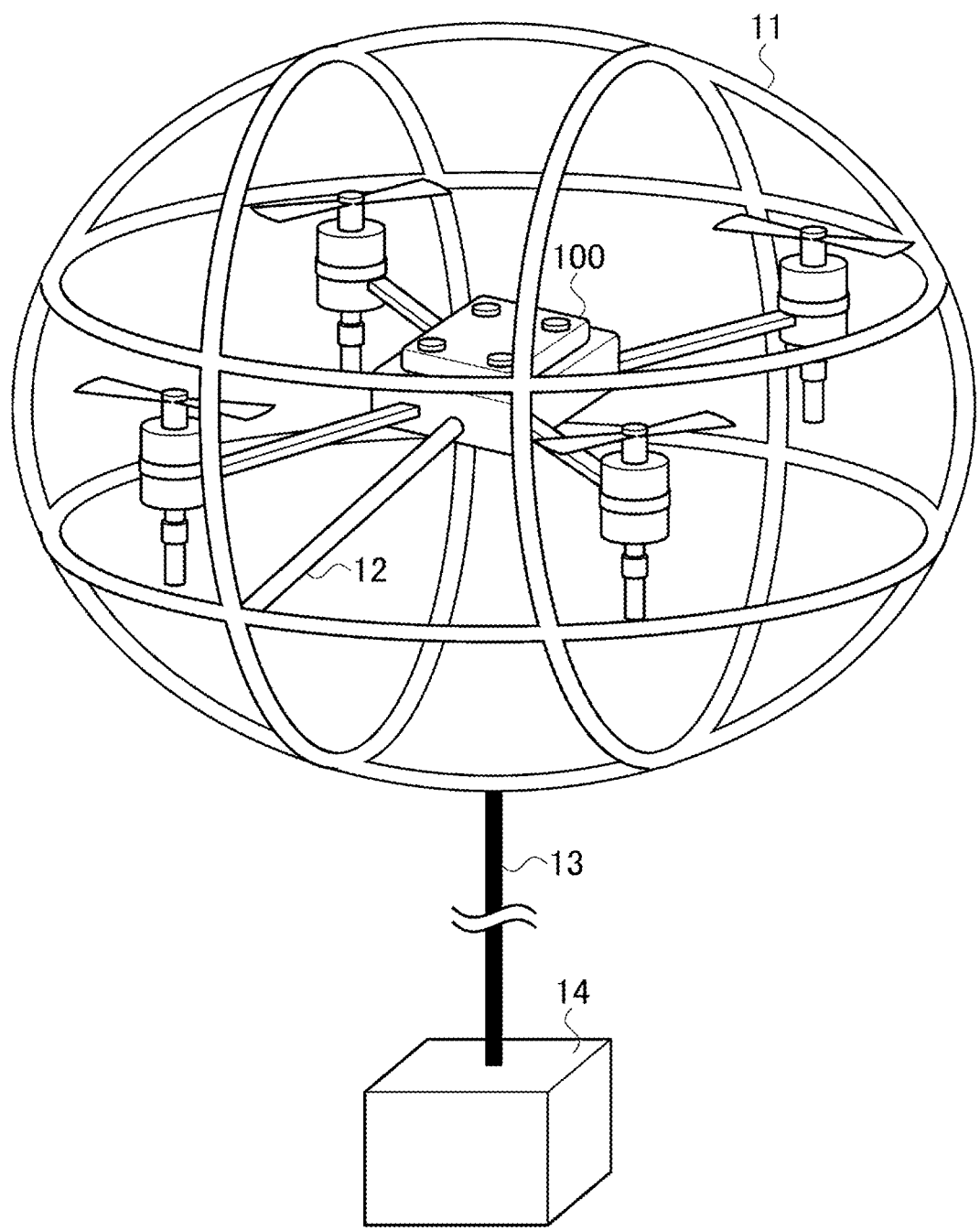

LIGHTNING STRIKE RESISTANT STRUCTURE OF FLYING OBJECT

CROSS-REFERENCE TO RELATED APPLICATIONS

This application is a National Stage application under 35 U.S.C. § 371 of International Application No. PCT/JP2020/042476, having an International Filing Date of Nov. 13, 2020.

The disclosure of the prior application is considered part of the disclosure of this application, and is incorporated by reference in its entirety into this application.

TECHNICAL FIELD

The present invention relates to a lightning strike resistant structure of a flying object.

BACKGROUND ART

An unmanned aerial vehicle such as a drone has been conventionally known. Since the unmanned aerial vehicle flies outdoors, there is a high risk of encountering a lightning strike. Therefore, in Non-Patent Literature 1, a direct lightning strike test is carried out in which a high voltage current directly strikes an unmanned aerial vehicle during flight. Then, it is reported that the current passes through an airframe of the unmanned aerial vehicle and reaches the ground, rendering the unmanned aerial vehicle inoperable.

CITATION LIST

Non-Patent Literature

Non-Patent Literature 1: The University of Manchester, "Drone vs lightning", Science and Engineering, [Retrieved on Oct. 30, 2020], the Internet <URL: https://www.mub.eps.manchester.ac.uk/science-engineering/2017/04/10/drone-vs-lightning/>

SUMMARY OF INVENTION

Technical Problem

In a case where a lightning strike occurs on an unmanned aerial vehicle, the unmanned aerial vehicle will break down and become inoperable, and thus there is a possibility that human and material losses occur due to a crash of the unmanned aerial vehicle.

The present invention has been made in view of the above circumstances, and an object of the present invention is to provide a technology capable of preventing deterioration of a flight function and a crash due to a lightning strike on a flying object.

Solution to Problem

A lightning strike resistant structure of a flying object according to an aspect of the present invention includes a lattice-shaped conductor surrounding a flying object with a distance not hindering flight, an attachment part for the conductor connected between the lattice-shaped conductor and a part of the flying object, and a conducting wire connected between the lattice-shaped conductor and a ground point on a ground.

Advantageous Effects of Invention

According to the present invention, it is possible to prevent deterioration of a flight function and crash due to a lightning strike on a flying object.

BRIEF DESCRIPTION OF DRAWINGS

FIG. 1 is a diagram illustrating a lightning strike resistant structure of an unmanned aerial vehicle.

DESCRIPTION OF EMBODIMENTS

Hereinafter, an embodiment of the present invention will be described with reference to the drawings. In the drawings, the same parts are denoted by the same reference signs, and description thereof is omitted.

FIG. 1 is a diagram illustrating a lightning strike resistant structure of an unmanned aerial vehicle according to the present embodiment. The lightning strike resistant structure of the unmanned aerial vehicle includes a conductor 11, an attachment part 12, a conducting wire 13, and a control facility 14.

The conductor 11 is a conductor that receives a lightning strike current from the sky instead of the unmanned aerial vehicle 100. The conductor 11 is arranged outside the periphery of the unmanned aerial vehicle 100 so as to surround the unmanned aerial vehicle 100 at a distance that does not hinder the flight of the unmanned aerial vehicle 100 located inside. The conductor 11 has a lattice shape as illustrated in FIG. 1. For example, the conductor 11 includes at least two ring-shaped wires. The overall shape of the conductor 11 is, for example, an elliptical shape, a spherical shape, or a rectangular shape.

The attachment part 12 is an attachment part for the conductor 11 for attaching and fixing the lattice-shaped conductor 11 to the unmanned aerial vehicle 100. The attachment part 12 is, for example, an insulating rod member. The rod member is connected between one point (part) of the lattice-shaped conductor 11 and one point (part) of the unmanned aerial vehicle 100. Although a plurality of rod members may be connected to a plurality of points of the unmanned aerial vehicle 100, it is preferable to connect one rod member to only one point of the unmanned aerial vehicle 100 in order to eliminate the possibility of the lightning strike current to flow into the unmanned aerial vehicle 100.

The conducting wire 13 is a conducting wire for causing a lightning strike current received by the lattice-shaped conductor 11 to flow to the ground. The conducting wire 13 is, for example, a conducting wire cable. The conducting wire cable is connected between a lower part of the lattice-shaped conductor 11 and an input end of the control facility 14 on the ground.

The control facility 14 is a control facility for controlling the lightning strike current passing through the conducting wire 13. The control facility 14 is installed on the ground. The control facility 14 is, for example, a lightning strike current cutoff device, a lightning rod, a structure on the ground, or a ground. Any ground point on the ground may be used.

That is, the lightning strike resistant structure of the unmanned aerial vehicle has a configuration in which the unmanned aerial vehicle 100 is surrounded by the lattice-shaped conductor 11 at a distance to such an extent that flight is not hindered on the outside of the unmanned aerial vehicle 100, the lattice-shaped conductor 11 is connected to a main body of the unmanned aerial vehicle 100 at one point, the conducting wire 13 is connected to the lower part of the lattice-shaped conductor 11, and the conducting wire 13 is connected to the control facility 14 on the ground.

With this configuration, even if a lightning strike occurs on the unmanned aerial vehicle 100, a lightning strike current due to the lightning strike is received by the lattice-shaped conductor 11 and flows to the ground via the lower conducting wire 13. The lightning stroke strike current is shunted by the lattice-shaped conductor 11, and electric fields due to the currents cancel each other inside the lattice-shaped conductor 11, so that the influence of the lightning strike current on the unmanned aerial vehicle 100 can be extremely reduced.

That is, a lightning strike does not enter the vicinity of the unmanned aerial vehicle 100 due to the Faraday gauge effect caused by the lattice-shaped conductor 11 surrounding the outside of the unmanned aerial vehicle 100. The Faraday gauge effect is an effect in which an electric line of force cannot enter the inside surrounded by the conductor, so that an external electric field is blocked and potentials inside are all equal. Furthermore, since the lightning strike current flows in a grid shape, the electric fields inside the grid cancel each other from four directions, and thus the lightning strike current can be extremely reduced.

As described above, according to the present embodiment, since the lightning strike resistant structure of the unmanned aerial vehicle includes the lattice-shaped conductor 11 surrounding the unmanned aerial vehicle 100 with a distance not hindering the flight, the attachment part 12 for the conductor 11 connected between the lattice-shaped conductor 11 and a part of the unmanned aerial vehicle 100, and the conducting wire 13 connected between the lattice-shaped conductor 11 and the control facility 14 on the ground, it is possible to prevent deterioration of the flight function and crash due to the lightning strike to the unmanned aerial vehicle 100.

Finally, in the present embodiment, although an unmanned aerial vehicle such as a drone has been described as an example, the present invention can be applied to a flying object to which the above-described lightning strike resistant structure can be added. The flying object is, for example, a balloon, a small manned aircraft, a flying object or aircraft flying in a high altitude, or the like.

REFERENCE SIGNS LIST

11 Conductor
12 Attachment part
13 Conducting wire
14 Control facility
100 Unmanned aerial vehicle

The invention claimed is:

1. A lightning strike resistant structure of a flying object, comprising:
   a lattice-shaped conductor surrounding the flying object with a distance not hindering flight;
   a conducting wire connecting the lattice-shaped conductor to a ground point of a ground, wherein the conducting wire causes a lightning strike current received by the lattice-shaped conductor to flow to the ground; and
   an insulating rod member connecting the lattice-shaped conductor to the flying object, wherein the lattice-shaped conductor is connected to only a single point of the flying object via the insulating rod member and prevents any portion of the lightning strike current from flowing into the flying object.

2. The lightning strike resistant structure according to claim 1, wherein
   The flying object is an unmanned aerial vehicle.

3. The lightning strike resistant structure according to claim 1, wherein the conducting wire connects the lattice-shaped conductor to a lightning rod disposed on the ground.

* * * * *